United States Patent
No et al.

(10) Patent No.: US 10,386,977 B2
(45) Date of Patent: Aug. 20, 2019

(54) DISPLAY DEVICE INCLUDING SENSOR CAPACITOR AND LIGHT EMITTING DEVICE THAT CONTACT SAME FACE OF INSULATING LAYER

(71) Applicant: Samsung Display Co., Ltd., Yongin-si, Gyeonggi-do (KR)

(72) Inventors: Young Soo No, Seoul (KR); Ki Cheol Kim, Yongin-si (KR); Yeon Tae Kim, Yongin-si (KR); Kyung Su Lee, Suwon-si (KR); Hwan-Hee Jeong, Cheonan-si (KR); In Young Han, Hwaseong-si (KR)

(73) Assignee: Samsung Display Co., , Ltd. (KR)

( * ) Notice: Subject to any disclaimer, the term of this patent is extended or adjusted under 35 U.S.C. 154(b) by 0 days.

(21) Appl. No.: 15/710,251

(22) Filed: Sep. 20, 2017

(65) Prior Publication Data
US 2018/0101259 A1   Apr. 12, 2018

(30) Foreign Application Priority Data

Oct. 7, 2016   (KR) ........................ 10-2016-0129996

(51) Int. Cl.
| | | |
|---|---|---|
| *G06F 3/044* | (2006.01) | |
| *G06F 3/041* | (2006.01) | |
| *G06F 21/32* | (2013.01) | |
| *H01L 27/32* | (2006.01) | |
| *G06K 9/00* | (2006.01) | |

(52) U.S. Cl.
CPC ............ *G06F 3/044* (2013.01); *G06F 3/0412* (2013.01); *G06F 3/0416* (2013.01); *G06F 21/32* (2013.01); *G06K 9/00006* (2013.01); *H01L 27/323* (2013.01)

(58) Field of Classification Search
CPC ...... G06F 3/0412; G06F 3/0416; G06F 3/044; H01L 27/323
See application file for complete search history.

(56) References Cited

U.S. PATENT DOCUMENTS

| 5,778,089 A | 7/1998 | Borza |
|---|---|---|
| 6,049,620 A | 4/2000 | Dickinson et al. |
| (Continued) | | |

FOREIGN PATENT DOCUMENTS

| KR | 10-2016-0027551 A | 3/2016 |
|---|---|---|
| KR | 10-2016-0057285 A | 5/2016 |
| KR | 10-2016-0065800 A | 6/2016 |

*Primary Examiner* — Ryan A Lubit
(74) *Attorney, Agent, or Firm* — Innovation Counsel LLP

(57) ABSTRACT

A display device may include a first transistor, a light emitting device, a sensor capacitor, and an insulating layer. The light emitting device may be electrically connected to the first transistor and may include a pixel electrode, a common electrode, and a light-emitting member positioned between the pixel electrode and the common electrode. The sensor capacitor may include a first capacitor electrode, a second capacitor electrode, and a dielectric layer. The dielectric layer may be positioned between the first capacitor electrode and the second capacitor electrode, may directly contact both the first capacitor electrode and the second capacitor electrode, and may not emit light. The second capacitor electrode may be electrically connected to the common electrode. A face of the insulating layer may directly contact each of the pixel electrode and the first capacitor electrode.

7 Claims, 9 Drawing Sheets

(56) References Cited

U.S. PATENT DOCUMENTS

| | | |
|---|---|---|
| 6,259,108 B1 | 7/2001 | Antonelli et al. |
| 9,117,679 B2 | 8/2015 | Ma |
| 2011/0074727 A1* | 3/2011 | Kim ..................... G06F 3/0412 |
| | | 345/174 |
| 2012/0038585 A1* | 2/2012 | Kim ..................... G06F 3/0412 |
| | | 345/174 |
| 2016/0299596 A1* | 10/2016 | den Boer ............ C03C 17/3671 |
| 2018/0136755 A1* | 5/2018 | Krasnov ................. G06F 3/044 |
| 2018/0181247 A1* | 6/2018 | Yang ..................... G06F 3/041 |

* cited by examiner

DISPLAY DEVICE INCLUDING SENSOR CAPACITOR AND LIGHT EMITTING DEVICE THAT CONTACT SAME FACE OF INSULATING LAYER

CROSS-REFERENCE TO RELATED APPLICATION

This application claims priority to and the benefit of Korean Patent Application No. 10-2016-0129996 filed in the Korean Intellectual Property Office on Oct. 7, 2016; the entire contents of the Korean Patent Application are incorporated herein by reference.

BACKGROUND

(a) Technical Field

This technical field relates to a display device including a sensor capacitor.

(b) Description of the Related Art

A display device (such as an organic light emitting display device or a liquid crystal display device) may have functions in addition to the function of displaying images. One example of such additional functions may be an authentication function using fingerprints.

A fingerprint sensor may be provided in a peripheral area (a non-display area) of a display panel of the display device. The structure may lead to an undesirably large device and/or an undesirably small image.

The above information disclosed in this Background section is for enhancement of understanding of the background of this application. The Background section may contain information that does not form the prior art that is already known in this country to a person of ordinary skill in the art.

SUMMARY

Embodiments may be related to a display device including a fingerprint sensor integrally formed with a display panel.

An embodiment may be related to a display device that includes the following elements: a pixel including a pixel transistor and a light-emitting device connected to the pixel transistor on a substrate; and a sensor including a sensor transistor and a sensor capacitor connected to the sensor transistor on the substrate. The light-emitting device includes a pixel electrode, a common electrode, and a light emitting member between the pixel electrode and the common electrode, the sensor capacitor includes a first electrode and a second electrode overlapping each other, the first electrode is disposed at a same layer as the pixel electrode, and the second electrode is disposed at a same layer as the common electrode.

The sensor transistor may have a same stacking structure as the pixel transistor.

The display device may further include: a planarization layer disposed on the pixel transistor and the sensor transistor; and a pixel definition layer disposed on the planarization layer and including an opening overlapping the pixel electrode of the light-emitting device and an opening overlapping a dielectric layer of the sensor capacitor.

The first electrode may be made of a same material as the pixel electrode. The first electrode may be connected to the sensor transistor through a contact hole formed in the planarization layer.

The second electrode may be part of the common electrode.

The dielectric layer may include a lower side and an upper side respectively contacting an upper side of the first electrode and a lower side of the common electrode.

The display device may generate data for fingerprint recognition based on signals sensed by at least two sensors.

The sensor may generate a sensing signal according to a self-capacitance scheme.

An embodiment may be related to a display device that includes the following elements: a pixel including a transistor and a light-emitting device connected to the transistor on a substrate; and a sensor including a sensor capacitor connected to the transistor on the substrate. The light-emitting device includes a pixel electrode, a common electrode, and a light emitting member between the pixel electrode and the common electrode, the sensor capacitor includes a first electrode and a second electrode overlapping each other, the first electrode is disposed as a same layer as the pixel electrode, and the second electrode is disposed as a same layer as the common electrode.

A dielectric layer of the sensor capacitor may surround at least part of the light emitting member in a top plan view of the display device.

The first electrode may be integrally formed with the pixel electrode.

The first electrode may be connected to the transistor through the pixel electrode.

The second electrode may be part of the common electrode.

The display device may further include a planarization layer disposed on the transistor, and a pixel definition layer disposed on the planarization layer. The first electrode and the pixel electrode may be connected to the transistor through a contact hole formed in the planarization layer.

The dielectric layer may be disposed between the first electrode and the pixel definition layer.

An upper side of the dielectric layer may contact a lower side of the pixel definition layer.

The dielectric layer may be a portion of a pixel definition layer overlapping the first electrode.

An upper side of the first electrode may contact a lower side of the pixel definition layer.

An embodiment may be related to a display device. The display device may include a first transistor, a light emitting device, a sensor capacitor, and an insulating (planarization) layer. The light emitting device may be electrically connected to the first transistor and may include a pixel electrode, a common electrode, and a light-emitting member positioned between the pixel electrode and the common electrode. The sensor capacitor may include a first capacitor electrode, a second capacitor electrode, and a dielectric layer. The dielectric layer may be positioned between the first capacitor electrode and the second capacitor electrode, may directly contact both the first capacitor electrode and the second capacitor electrode, and may not emit light. The second capacitor electrode may be electrically connected to the common electrode. A face of the insulating layer may directly contact each of the pixel electrode and the first capacitor electrode.

The display device may include a second transistor, which may be electrically connected to the first capacitor electrode and may remain not electrically connected to the first transistor.

The display device may include a pixel definition layer, which may directly contact the insulating layer, may include an opening that exposes the pixel electrode, and may include an opening that exposes the first capacitor electrode.

A material of the first capacitor electrode may be identical to a material of the pixel electrode.

A minimum distance between the first capacitor electrode and the second capacitor electrode may be equal to a minimum distance between the pixel electrode and the common electrode.

A thickness of the dielectric layer may be equal to a thickness of the light emitting member.

The insulating layer may directly contact the first transistor.

The insulating layer may have a first contact hole and a second contact hole. A portion of the pixel electrode extends through the first contact hole. A portion of the first capacitor electrode extends through the second contact hole and may be as long as the portion of the pixel electrode.

The sensor capacitor may be electrically connected to the first transistor.

The dielectric layer may directly contact the light emitting member.

The first capacitor electrode may be electrically connected to the pixel electrode.

The first capacitor electrode may be connected to the first transistor through the pixel electrode.

An average distance between the first capacitor electrode and the second capacitor electrode may be greater than an average distance between the pixel electrode and the common electrode.

The display device may include a pixel definition layer. The pixel definition layer may directly contact the insulating layer, may directly contact the first capacitor electrode, may expose the light emitting member, and may not directly contact the pixel electrode. The first capacitor electrode and the pixel electrode may be electrically connected to the first transistor through a contact hole formed in the insulating layer.

The dielectric layer may be disposed between the first capacitor electrode and the pixel definition layer. A material of the dielectric layer may be different from each of a material of the pixel definition layer and a material of the light emitting member.

At least two faces of the dielectric layer directly contact the pixel definition layer.

The pixel definition layer may directly contact at least two faces of the first capacitor electrode.

The first capacitor electrode may directly contact at least three faces of the pixel electrode.

The dielectric may surround the light emitting member.

The dielectric layer may directly contact at least three faces of the light emitting member. According embodiments, a display device may include a fingerprint sensor integrally formed with a display panel.

DETAILED DESCRIPTION OF EMBODIMENTS

Figure 1:
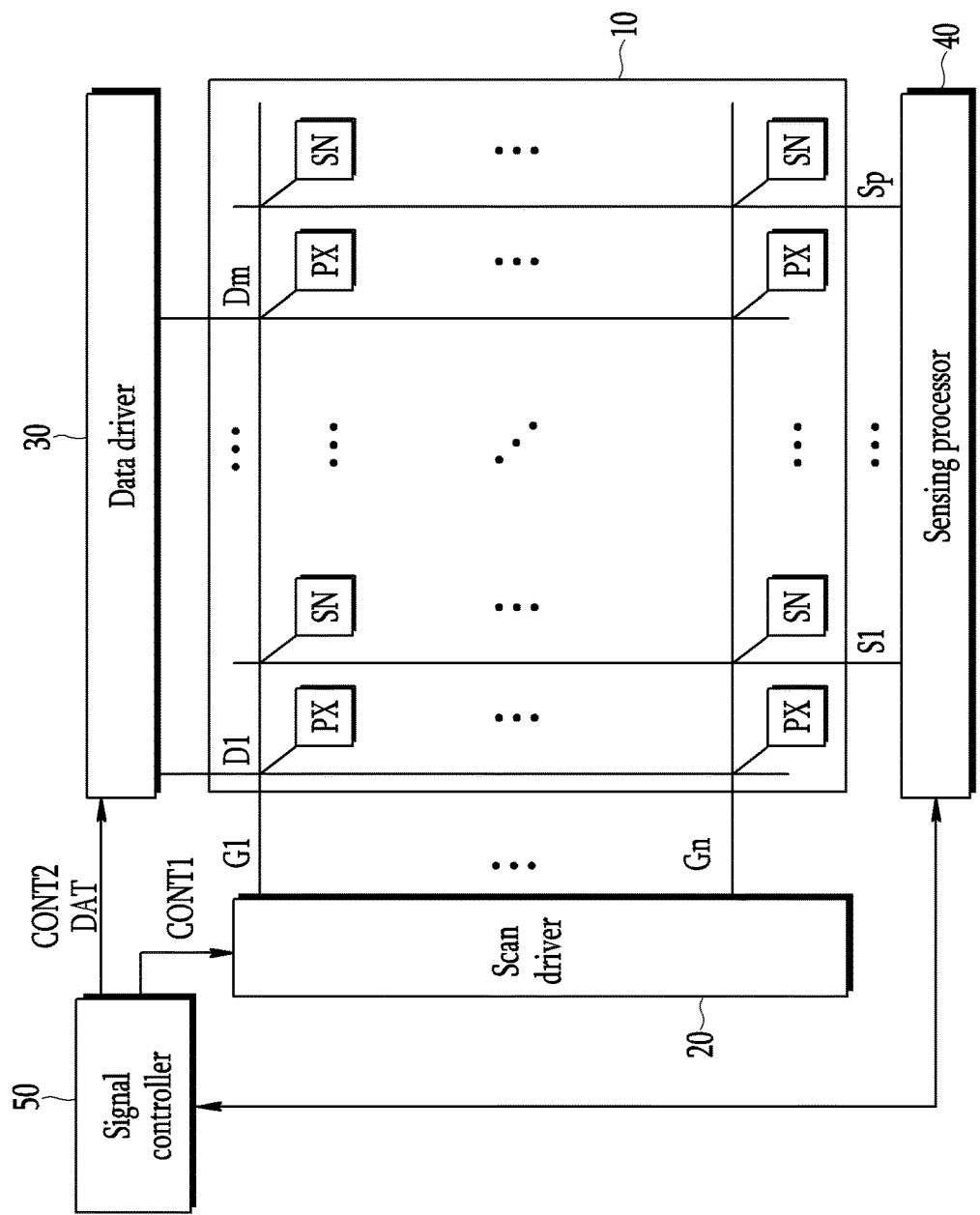
FIG. 1 shows a layout view of a display device including a fingerprint sensor according to an embodiment.

Example embodiments are described with reference to the accompanying drawings. As those skilled in the art would realize, the described embodiments may be modified in various ways.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Like reference numerals may designate like elements.

In the drawings, thicknesses of layers, films, panels, regions, etc., may be exaggerated for clarity.

When a first element (such as a layer, film, region, or substrate) is referred to as being "on" a second element, the first element can be directly on the second element, or one or more intervening elements may also be present. In contrast, when a first element is referred to as being "directly on" a second element, there are no intended intervening elements (except for environmental elements such as air) present between the first element and the second element.

Unless explicitly described to the contrary, the word "comprise" and variations such as "comprises" or "comprising" may imply inclusion of stated elements but not exclusion of other elements. The term "connect" may mean "electrically connect".

FIG. 1 shows a layout view of a display device including a fingerprint sensor according to an embodiment.

Referring to FIG. 1, the display device includes a display panel 10, a scan driver 20, a data driver 30, a sensing processor 40, and a signal controller 50.

The display panel 10 includes gate lines G1-Gn, data lines D1-Dm, pixels PX, sensor lines S1-Sp, and fingerprint sensors SN (or sensors SN). The pixels PX are connected to the gate lines G1-Gn and the data lines D1-Dm and are arranged in an array (or matrix). The fingerprint sensors SN are connected to the gate lines G1-Gn, connected to the sensor lines S1-Sp, and arranged in an array (or matrix).

The gate lines G1-Gn may generally extend in a first direction (e.g., a row direction), and the data lines D1-Dm may extend in a second direction (e.g., column direction) crossing the first direction. Each pixel PX may receive a gate signal including a gate-on voltage for turning on a switching element such as a transistor and a gate-off voltage for turning it off through a gate line, and may receive a data signal corresponding to an image signal through a data line when the switching element is turned on. Driving voltage lines (not shown) for transmitting a driving voltage to the pixels PX and signal lines (not shown) for transmitting an emission signal and/or an initialization signal to the pixels PX may be disposed on the organic light emitting devices.

A pixel PX is a unit for displaying a portion of an image. A pixel may display one of several primary colors, and/or a plurality of pixels may display a plurality of primary colors.

The sensor lines S1-Sp substantially extend in the column direction and/or the row direction, and are connected to the sensors SN to transmit sensing signals to the sensing processor 40.

A sensor SN may generate a sensing signal caused by a touch according to a self-capacitance scheme. For example, when a driving signal is input to the sensor SN, a capacitor of the sensor SN is charged with a predetermined amount of charge, and the amount of charge that is changed by a touch of an external object such as a finger is output as a sensing signal to the sensing processor 40 through the corresponding one of the sensor lines S1-Sp. The driving signal of the sensor SN may be applied to a sensor SN through one of the sensor lines S1-Sp and/or may be applied through an additional/different signal line.

The signal controller 50 may control the scan driver 20 and the data driver 30. The signal controller 50 may receive an image signal and control signals from an external device, e.g., a graphics processor (not shown). The control signals may include a horizontal synchronizing signal Hsync, a vertical synchronization signal Vsync, a clock signal CLK, and a data enable signal DE. The signal controller 50 may process the image signal according to an operating condition of the display panel 10 based on the image signal and the control signals for generating and providing image data DAT, a gate control signal CONT1, a data control signal CONT2, and a clock signal. The signal controller 50 may control the sensing processor 40.

The scan driver 20 may receive a gate control signal CONT1 from the signal controller 50 to generate gate signals including a gate-on voltage and a gate-off voltage and may apply the gate signals to the gate lines G1-Gn. Pixels PX and their corresponding sensors SN may be connected to the same scan driver 20 or connected to different scan drivers. Pixels PX and their corresponding sensors SN may be connected to the same gate line or connected to different gate lines.

The data driver 30 may receive a data control signal CONT2 and image data DAT from the signal controller 50, may convert the image data DAT into data voltages using a gray voltage generated by a gray voltage generator (not shown), and may applies the data voltages to the data lines D1-Dm.

When switching elements of some sensors SN are turned on by one or more gate signals, the sensing processor 40 applies one or more driving signals to the sensors SN and receives one or more sensing signals from the sensors SN. For example, a driving signal may be generated when a synchronization signal or a sensing enable signal is received from the signal controller 50, and it may include a periodically output pulse or at least two different voltage levels. The sensing processor 40 generates sensing data based on the sensing signal. To generate the sensing data, the sensing processor 40 may include an integrator and an analog-to-digital converter. The sensing data may include data related to protrusions and/or depressions of the fingerprint. The sensing data may be transmitted to the signal controller 50 or an external controller/processor for generating fingerprint information.

Figure 2:
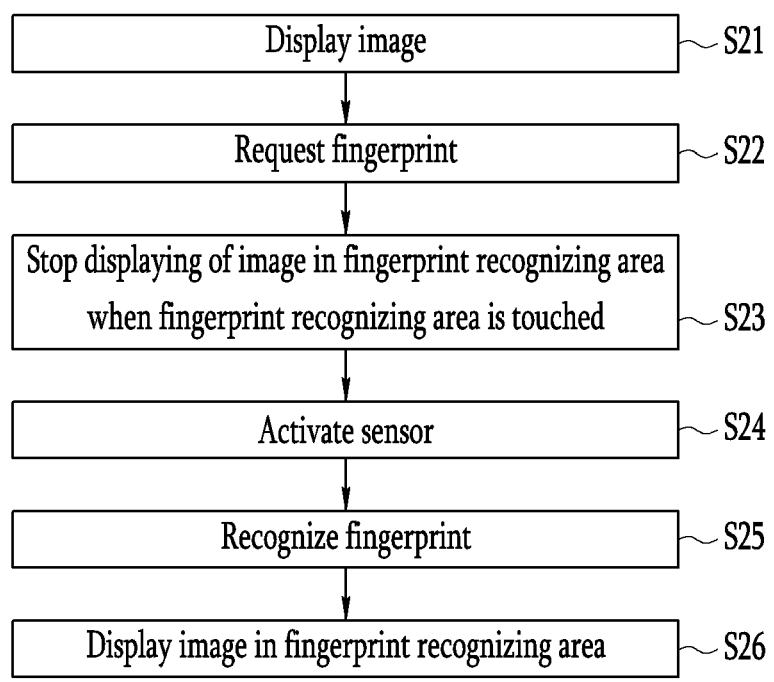
FIG. 2 shows a flowchart of a process for a display device including a fingerprint sensor according to an embodiment to recognize a fingerprint.

FIG. 2 shows a flowchart of a process for a display device including a fingerprint sensor according to an embodiment to recognize a fingerprint.

Referring to FIG. 2, the display device displays an image on a screen of a display panel (S21). When user authentication is required, the display device requests a fingerprint from a user (S22). The image provided at the request of a fingerprint may display a fingerprint recognizing area in a predetermined region on the screen. The fingerprint recognizing area may show a fingerprint figure.

When the user touches the fingerprint recognizing area with his/her finger, the display device checks the touch and stops displaying an image of the fingerprint recognizing area (S23). In this instance, all the pixels of the fingerprint recognizing area may be in the off state, or the pixels of a specific color of the fingerprint recognizing area may be in the off state. A signal (e.g., an emission signal) for displaying an image may not be applied to the pixels in the off state, and a black data voltage or a gate-off voltage may be applied to the pixels. The user's touch may be sensed by a fingerprint sensor or an additional touch sensor.

The fingerprint sensor is activated (S24), and the fingerprint is recognized (S25). When the fingerprint sensor is activated, the sensing processor may apply one or more driving signals to the sensors provided in the fingerprint recognizing area, and may receive one or more sensing signals from the sensors to generate recognition data. The signal controller or another controller/processor recognizes the fingerprint based on the generated sensing data. When the fingerprint is recognized, the fingerprint recognizing area having stopped displaying of an image starts displaying an image (S26). That is, the pixels in the off state in the fingerprint recognizing area are turned on, and the screen of the display panel displays the image.

If a signal is applied to pixels positioned around the sensor, the signal may interfere with the fingerprint sensor. According to an embodiment, no signal for displaying an image in the fingerprint recognizing area is applied in the steps of activating the fingerprint sensor and recognizing the fingerprint; therefore, undesirably interference may be prevented, and sensing sensitivity and sensing reliability may be optimized. When the fingerprint sensor is activated, the pixels on the screen as well as the fingerprint recognizing area may be in the off state.

Figure 3:
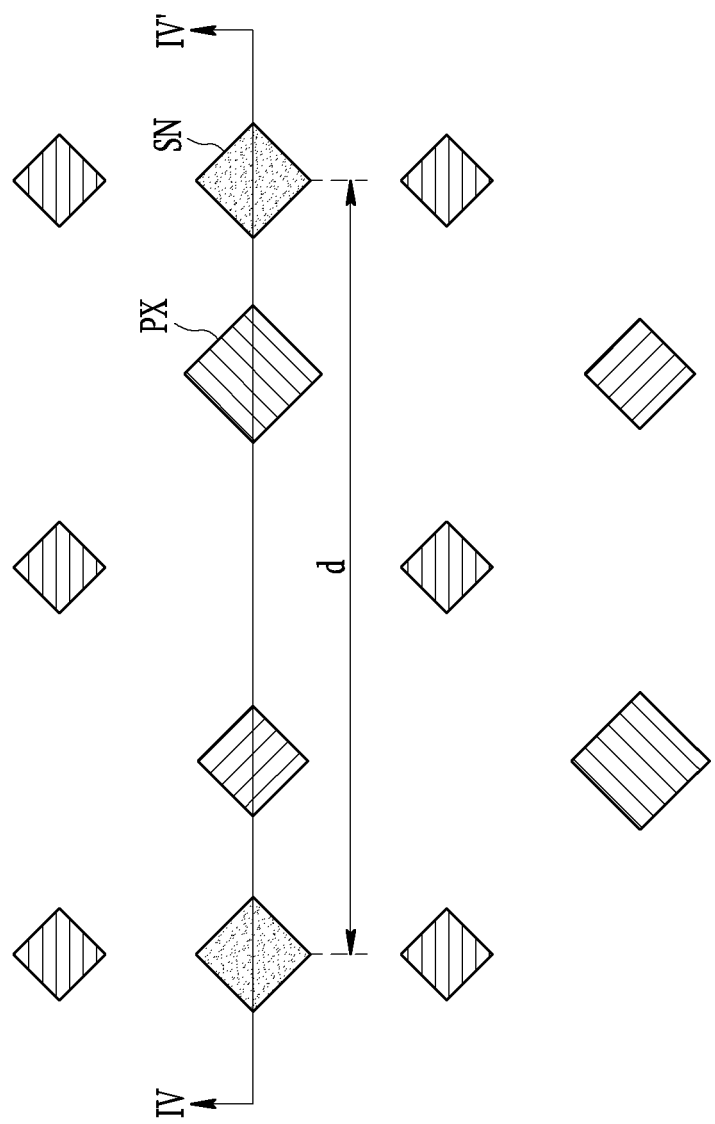
FIG. 3 shows a top plan view of pixels and sensors in a display device according to an embodiment.
Figure 4:
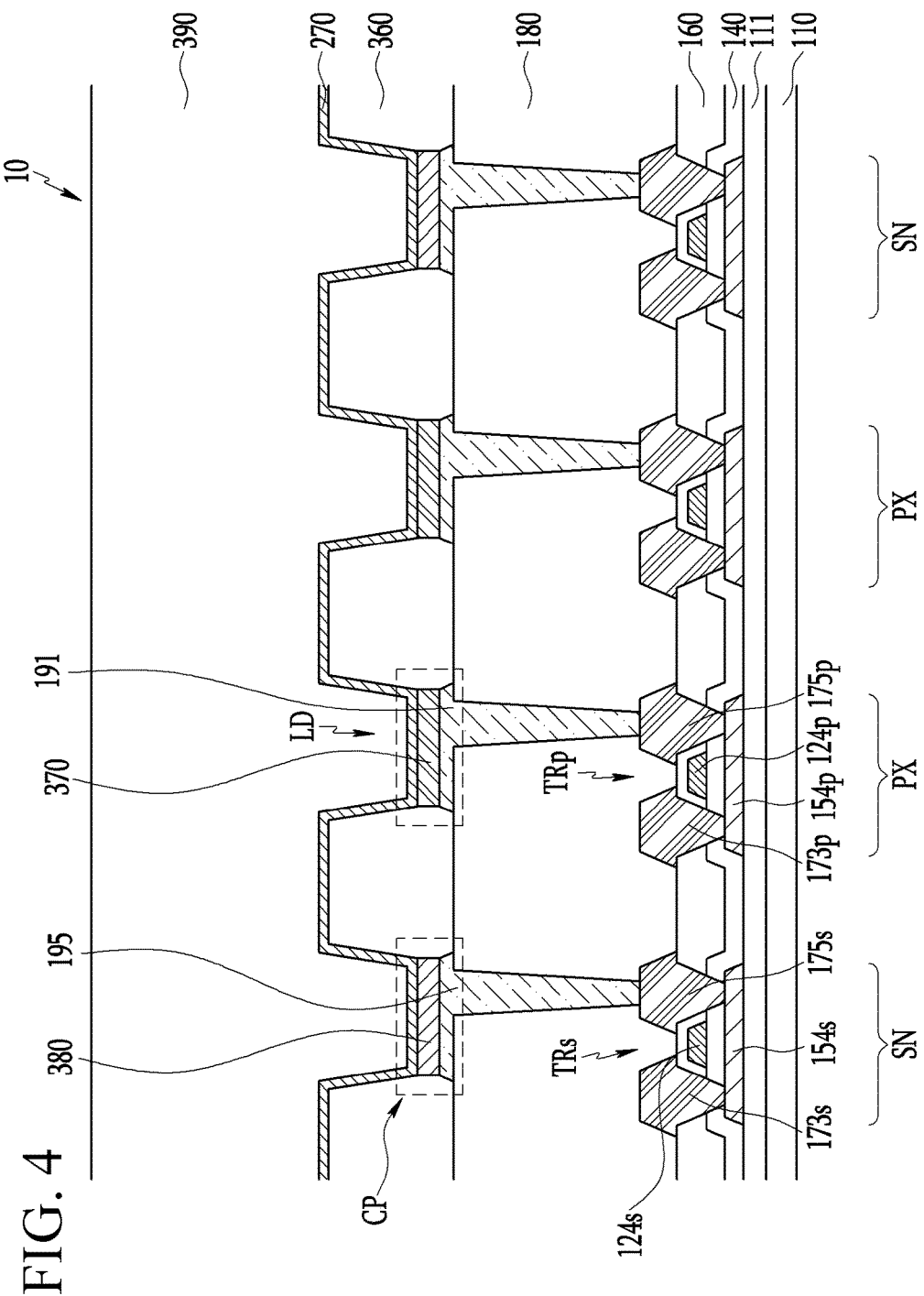
FIG. 4 shows a cross-section view with respect to a line IV-IV' of FIG. 3 according to an embodiment.

FIG. 3 shows a top plan view of a pixel and a sensor in a display device according to an embodiment, and FIG. 4 shows a cross-section view with respect to a line IV-IV' of FIG. 3 according to an embodiment.

Referring to FIG. 3 and FIG. 4, pixels PX are disposed at predetermined intervals on the display panel 10 of the display device according to an embodiment, and sensors SN are disposed at predetermined intervals and are spaced from the pixels PX.

The pixels PX may include a red pixel, a green pixel, and a blue pixel, and may have substantially quadrangle shapes in the plan view. Sizes and/or numbers of the pixels PX are configured according to the colors. For example, the blue pixels may be the biggest, and the green pixels may be the most per unit area. The size, shape, and disposal of the pixels PX may be configured according to embodiments.

Each pixel PX includes a light-emitting device LD and a pixel transistor TRp for controlling light emission (e.g., an amount of current flowing to the light-emitting device LD or on/off states of the light-emitting device LD) of the light-emitting device LD. Each pixel PX may include a plurality of transistors and at least one capacitor.

The sensors SN may be arranged in an array (or matrix). A distance d between midpoints of two immediately adjacent sensors SN may be substantially equal to or less than a distance between a midpoint of a ridge and a midpoint of an immediately neighboring valley of a typical fingerprint. For example, the distance between midpoints of two immediately adjacent sensors SN may be equal to or less than about 50 micrometers. In FIG. 3, two pixels PX are provided between adjacent sensors SN, and other pixels PX may be provided according to the resolution of the display device.

Each sensor SN includes a sensor capacitor CP and a sensor transistor TRs. The amount of charge of the sensor capacitor CP may be changed by a touch such as by a finger, and the sensor transistor TRs may control transmission of a driving signal from a sensor line to the sensor capacitor CP and output of a sensing signal from the sensor capacitor CP to a sensor line. A gate electrode 124s of the sensor transistor TRs may be connected to one of the gate lines G1-Gn shown in FIG. 1, a source electrode 173s of the sensor transistor TRs may be connected to one of the sensor lines S1-Sp shown in FIG. 1, and a drain electrode 175s may be connected to an electrode 195 of the sensor capacitor CP.

The sensor capacitor CP may substantially have a same stacking structure or cross-sectional structure as the light-emitting device LD of the pixel PX. The sensor transistor TRs may substantially have a same stacking structure or cross-sectional structure as the transistor TRp (or pixel transistor TRp) of the pixel PX. However, regarding the light-emitting device LD, a light emitting member 370 is provided between two electrodes 191 and 270, and regarding the sensor capacitor CP, a dielectric layer 380 is provided between two electrodes 195 and 270. A lower side of the dielectric layer 380 may contact an upper side of the first electrode 195, and an upper side of the dielectric layer 380 may contact a lower side of the common electrode 270.

With reference to FIG. 4, the display panel 10 includes a substrate 110, and pixels PX and sensors SN are provided on the substrate 110. The pixels PX and the sensors SN are formed by combinations of a plurality of layers formed on the substrate 110.

The substrate 110 may be a transparent insulation substrate made of a flexible material such as plastic or a rigid material such as glass.

A barrier layer 111 (or buffer layer) for preventing spreading of impurities and/or for preventing permeation of moisture is provided on the substrate 110. The barrier layer 111 may include an inorganic insulating material such as a silicon oxide (SiOx) or a silicon nitride (SiNx).

A semiconductor 154p of the pixel transistor TRp and a semiconductor 154s of the sensor transistor TRs are provided on the barrier layer 111. The semiconductors 154p and 154s each include a channel region and include a doped source region and a doped drain region provided on two sides of the channel region. The semiconductors 154p and 154s may include polysilicon, amorphous silicon, or an oxide semiconductor.

Although not shown, a light blocking member/electrode may be provided between the substrate 110 and the semiconductors 154p and 154s. The light blocking member/electrode blocks external light from reaching the semiconductors 154p and 154s to prevent the semiconductor 154 from deteriorating and/or to minimize one or more leakage currents of the transistors TRp and TRs.

A gate insulating layer 140 is provided on the semiconductors 154p and 154s. The gate insulating layer 140 may include an inorganic insulating material such as a silicon oxide (SiOx) or a silicon nitride (SiNx).

A set of gate conductors including a gate electrode 124p of the pixel transistor TRp, a gate electrode 124s of the sensor transistor TRs, and a gate line (not shown) is provided on the gate insulating layer 140. The gate electrodes 124p and 124s may overlap the channel regions of the semiconductors 154p and 154s. The gate conductors may include at least a metal material such as at least one of molybdenum (Mo), copper (Cu), aluminum (Al), silver (Ag), chromium (Cr), tantalum (Ta), titanium (Ti), and a metal alloy, and may be formed to have a single layer structure or a multilayer structure.

An inter-layer insulating layer 160 including an inorganic insulating material is provided on the gate conductors. The inter-layer insulating layer 160 may include an inorganic insulating material such as a silicon oxide, a silicon nitride, a silicon oxynitride (SiON), or a silicon oxyfluoride (SiOF).

A set of data conductors including a source electrode 173p and a drain electrode 175p of the pixel transistor TRp, a source electrode 173s and a drain electrode 175s of the sensor transistor TRs, a data line (not shown), and a driving voltage line (not shown) is provided on the inter-layer insulating layer 160. The source electrodes 173p and 173s and the drain electrodes 175p and 175s may be connected to the source regions and the drain regions of the semiconductors 154p and 154s through contact holes formed in the inter-layer insulating layer 160. The data conductors may include at least a metal material such as at least one of aluminum (Al), copper (Cu), silver (Ag), gold (Au), platinum (Pt), palladium (Pd), nickel (Ni), molybdenum (Mo), tungsten (W), titanium (Ti), chromium (Cr), tantalum (Ta), and a metal alloy, and may be formed to have a single layer structure or a multilayer structure (e.g., Ti/Al/Ti, Mo/Al/Mo, or Mo/Cu/Mo).

The gate electrode 124p, the source electrode 173p, and the drain electrode 175p form a pixel transistor TRp together with the semiconductor 154p. The shown pixel transistor TRp may be a driving transistor of the corresponding organic light emitting device. The gate electrode 124s, the source electrode 173s, and the drain electrode 175s form a sensor transistor TRs together with the semiconductor 154s. The sensor transistor TRs may be referred to as a selecting transistor or a lead-out transistor. The sensor transistor TRs may be formed with same materials as the pixel transistor TRp. The gate electrodes 124p and 124s of the shown transistors TRp and TRs are provided higher (or farther from the substrate 110) than the semiconductor 154p and 154s, so the shown transistors may be top-gate transistors. In an embodiment, the transistors may be bottom-gate transistors.

A planarization layer 180 is provided on the data conductors. The planarization layer 180 may fill and planarize steps so as to increase light emission efficiency of the light-emitting device LD. The planarization layer 180 may include an organic insulating material.

A pixel electrode 191 of the light-emitting device LD is provided on the planarization layer 180. The pixel electrode 191 is connected to the drain electrode 175p of the pixel transistor TRp through a contact hole formed in the planarization layer 180. A first electrode 195 of the sensor capacitor CP is provided on the planarization layer 180. The first electrode 195 is connected to the drain electrode 175s of the sensor transistor TRs through a contact hole formed in the planarization layer 180. The pixel electrode 191 and the first electrode 195 may be made of a same material; for example, they may be made of a reflective conductive material or a semi-transmitting conductive material, or they may be made of a transparent conductive material. For example, the pixel electrode 191 and the first electrode 195 may include a transparent conductive material such as an indium tin oxide (ITO) or an indium zinc oxide (IZO), and/or a metal such as lithium (Li), calcium (Ca), aluminum (Al), silver (Ag), magnesium (Mg), or gold (Au).

A pixel definition layer 360 including openings exposing the pixel electrode 191 and the first electrode 195 is provided on the planarization layer 180. The pixel definition layer 360 may include an organic insulating material such as polyimide, polyacrylate, or polyamide.

A light emitting member 370 of the light-emitting device LD is provided on the pixel electrode 191. The light emitting member 370 may include a first organic common layer, an emission layer, and a second organic common layer. The first organic common layer may include at least one of a hole injection layer and a hole transfer layer. The emission layer may be made of an organic material for intrinsically displaying light of a primary color such as one of red, green, and blue, and may have a structure in which a plurality of organic material layers for displaying one or more of different colors are deposited. The second organic common layer may include at least one of an electron transfer layer and an electron injection layer.

A dielectric layer 380 of the sensor capacitor CP is provided on the first electrode 195. The dielectric layer 380 may include an inorganic insulating material such as a silicon oxide or a silicon nitride, and/or it may include an organic insulating material. The opening of the pixel definition layer 360 exposing the first electrode 195 exposes the dielectric layer 380.

A common electrode 270 for transmitting a common voltage is provided on the light emitting member 370. The common electrode 270 is also provided on the dielectric layer 380. The common electrode 270 may include a transparent conductive material such as an indium tin oxide (ITO) or an indium zinc oxide (IZO). The common electrode 270 may be formed to have a light transmitting property by stacking thin layers formed of one or more metal materials such as at least one of calcium (Ca), barium (Ba), magnesium (Mg), aluminum (Al), and silver (Ag). The common electrode 270 may substantially cover an entire side of the display panel 10, or it may include portions separated in a row direction and/or a column direction.

The pixel electrode 191 of the pixel PX, the light emitting member 370, and the common electrode 270 form a light-emitting device LD that is an organic light emitting diode. In an embodiment, the pixel electrode 191 may be an anode that is a hole injection electrode, and the common electrode 270 may be a cathode that is an electron injection electrode. In an embodiment, the pixel electrode 191 may be a cathode, and the common electrode 270 may be an anode. The holes and electrons are injected into the light emitting member 370 from the pixel electrode 191 and the common electrode 270, and when excitons (resulted from combinations of the injected holes and electrons) change to a ground state from an excited state, light emits.

The first electrode 195 of the sensor SN, the dielectric layer 380, and the common electrode 270 form a sensor capacitor CP. In an embodiment, a portion of the common electrode 270 corresponds to the second electrode of the sensor capacitor CP facing the first electrode 195 with the dielectric layer 380 disposed between the two electrodes.

An encapsulation layer 390 is provided on the common electrode 270. The encapsulation layer 390 encapsulates the light emitting member 370 and the common electrode 270 to prevent external moisture or oxygen from damaging components of the display panel 10. The encapsulation layer 390 may include at least one layer including an inorganic material, and may further include at least one layer including an organic material. A polarization member (not shown) for preventing reflection of external light may be provided on the encapsulation layer 390.

A sensor SN may be different from a pixel PX in size and shape, but they substantially have the same stacking structure. The sensor transistor TRs may have substantially the same stacking structure as the pixel transistor TRp, and the sensor capacitor CP may have substantially the same stacking structure as the light-emitting device LD. As a difference, in the light-emitting device LD, the light emitting member 370 is disposed between the pixel electrode 191 and the common electrode 270, and in the sensor capacitor CP, the dielectric layer 380 is disposed between the first electrode 195 and the common electrode 270, which is the second electrode. The dielectric layer 380 is formed of a material that is different from that of the light emitting member 370, so an additional mask may be needed in order to form the dielectric layer 380. Nevertheless, no additional processing step may be required, and the manufacturing cost and time may have no significant increase.

Figure 5:
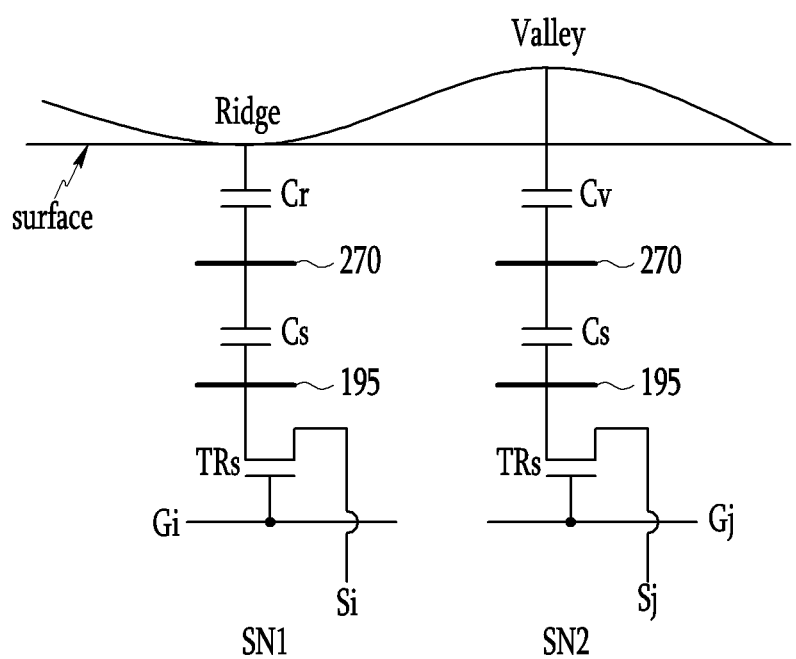
FIG. 5 shows a concept of a sensor relating to fingerprint recognition as a circuit in a display device according to an embodiment.

FIG. 5 shows a concept of a sensor relating to fingerprint recognition as a circuit in a display device according to an embodiment.

FIG. 5 shows a configuration relating to two sensors SN1 and SN2 represented by a circuit diagram. Referring to FIG. 1 to FIG. 4, as well as FIG. 5, the first sensor SN1 and the immediately neighboring second sensor SN2 each include a sensor capacitor CP and a sensor transistor TRs, and a first electrode 195 of the sensor capacitor CP is connected to the corresponding sensor line of the sensor lines (Si, Sj) through the drain electrode 175s and the source electrode 173s of the corresponding sensor transistor TRs. A gate electrode 124s of the corresponding sensor transistor TRs is connected to the corresponding gate line of the gate lines (Gi, Gj). Capacitance (Cs) of the sensor capacitor CP of the first sensor SN1 may substantially correspond/equal to capacitance (Cs) of the sensor capacitor CP of the second sensor SN2.

When a gate-on voltage is applied to each of the gate lines (Gi, Gj) to turn on the corresponding sensor transistor TRs, a driving signal is applied through the corresponding sensor line of the sensor lines (Si, Sj) to charge the corresponding sensor capacitor CP.

When the user touches, for example, a surface of the display panel 10, capacitances (Cr, Cv) are generated between the finger and the second electrode 270 of the sensor capacitor CP. In an embodiment, capacitance (Cr) formed between the second electrode 270 of the first sensor SN1 and the corresponding ridge of the fingerprint is different from (and unequal to) capacitance (Cv) formed between the second electrode 270 of the second sensor SN2 and the corresponding valley of the fingerprint. Therefore, the change of charge of the sensor capacitor CP of the first sensor SN1 corresponding to the ridge of the fingerprint is different from the change of charge of the sensor capacitor CP of the second sensor SN2 corresponding to the valley of the fingerprint. As a result, the sensing signal output through the sensor line (Si) connected to the first sensor SN1 is different from the sensing signal output through the sensor line (Sj) connected to the first sensor SN2, and the sensing processor 40 may use the sensing signals to generate sensing data including data related to protrusions and depressions of the fingerprint. The sensing data for detecting the fingerprint are based upon two capacitances (Cr, Cv) sensed by the different sensors SN1 and SN2.

When the fingerprint is sensed, the second electrode 270 may be floating. The fingerprint may be sensed when no image is displayed. When the fingerprint is being sensed, a ground voltage may be applied to the second electrode 270.

While the sensor transistor TRs is turned on, the sensing processor 40 may apply a driving signal to the sensor capacitor CP through the corresponding sensor line of the sensor lines (Si, Sj) and may receive a sensing signal from the corresponding sensor capacitor CP. Driving signal may be sequentially applied to sensors SN, and the sensors SN may operate in response to gate-on voltages applied through the gate lines G1-Gn. The sensors SN may independently sense touches to perform multi-touch sensing as well as fingerprint sensing.

Figure 6:
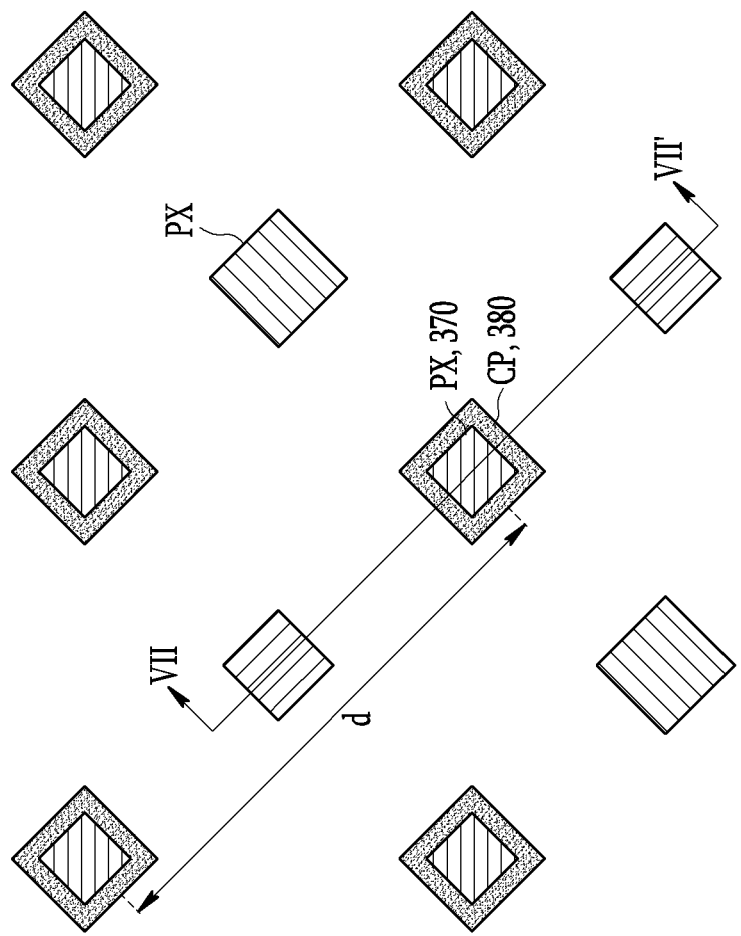
FIG. 6 shows a top plan view of pixels and sensors in a display device according to an embodiment.
Figure 7:
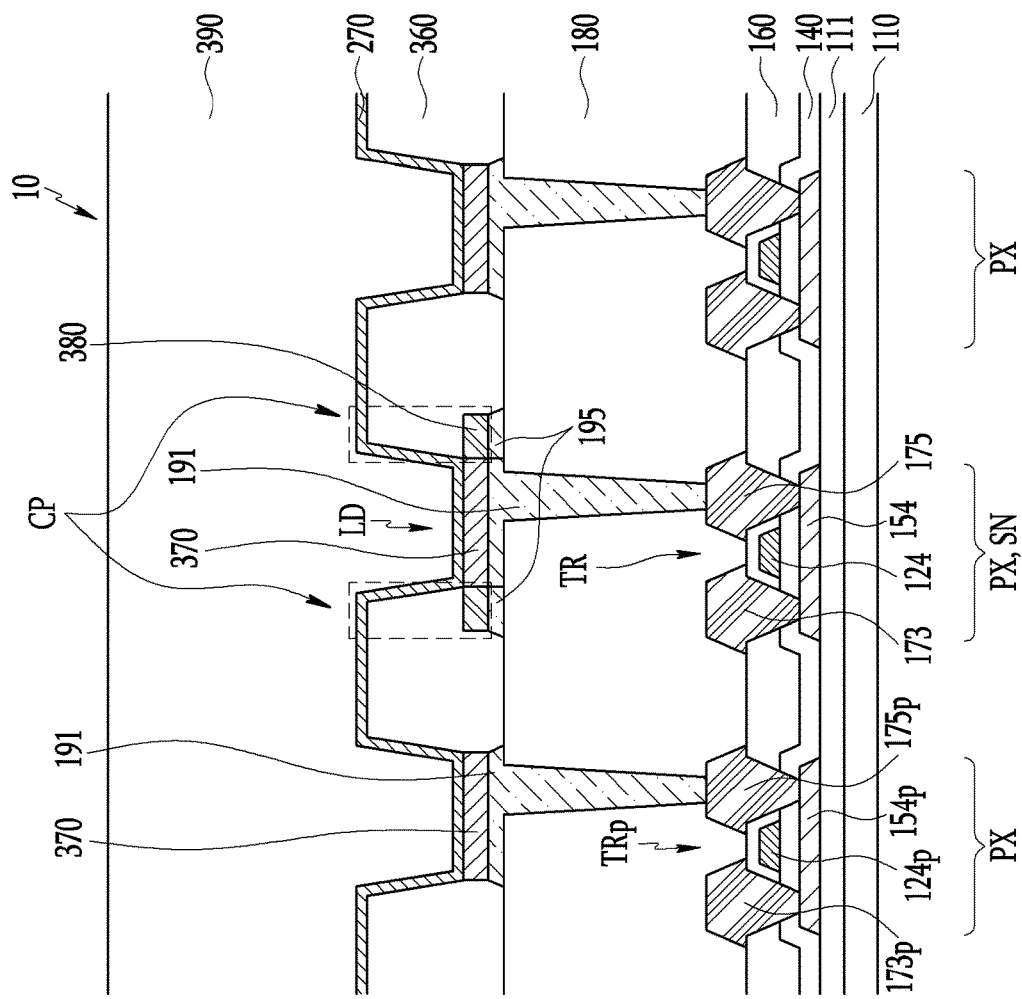
FIG. 7 shows a cross-section view with respect to a line VII-VII' of FIG. 6 according to an embodiment.

FIG. 6 shows a top plan view of a pixel and a sensor in a display device according to an embodiment, and FIG. 7 shows a cross-section with respect to a line VII-VII' of FIG. 6 according to an embodiment.

Referring to FIG. 6 and FIG. 7, the sensor SN is not separated from the pixel PX, and the pixel PX may share part of the sensor SN. In an embodiment, the capacitor CP of the sensor SN is formed around the light-emitting device LD, and the sensor SN and the pixel PX share the transistor TR.

The sensor capacitor CP includes a first electrode 195, a dielectric layer 380, and a portion of a common electrode 270, which is a second electrode and faces the first electrode 195. The dielectric layer 380 may surround the light emitting member 370. The dielectric layer 380 may substantially have a quadrangular ring shape surrounding the light emitting member 370 in a top plan view. In an embodiment, the dielectric layer 380 may have a circular ring shape. An internal edge/perimeter of the dielectric layer 380 may or may not directly contact an external edge/perimeter of the light emitting member 370. A pixel definition layer 360 is provided on the dielectric layer 380. In an embodiment, the pixel definition layer 360 may not completely cover the dielectric layer 380, and an upper side of the dielectric layer 380 may contact a lower side of the common electrode 270.

The first electrode 195 of the sensor capacitor CP may overlap the dielectric layer 380 and may be positioned between the dielectric layer 380 and the planarization layer 180. The first electrode 195 may be part of a same material layer as the pixel electrode 191. The first electrode 195 may be directly and/or electrically connected to the pixel electrode 191. The first electrode 195 may surround the pixel electrode 191. The first electrode 195 may be an extension of the pixel electrode 191. The first electrode 195 may be integrally formed with the pixel electrode 191 with the same material. The first electrode 195 is connected to a drain electrode 175 of the transistor TR through the pixel electrode 191.

The transistor TR shared by the sensor SN and the pixel PX is used as a pixel transistor when an image is displayed by the pixel PX, and it is used as a sensor transistor when an image/fingertip is sensed by the sensor SN. The transistor TR may have a same structure as the pixel transistor TRp of a pixel PX that is not directly connected to a sensor SN. To be used as a sensor transistor, a source electrode 173 of the transistor TR may be connected to the sensing processor 40 shown in FIG. 1, and a gate electrode 124 of the transistor TR may be connected through one of the gate lines G1-Gn to the scan driver 20.

Advantageously, according to an embodiment, space and/or material required for forming sensors SN on a display panel may be minimized.

Figure 8:
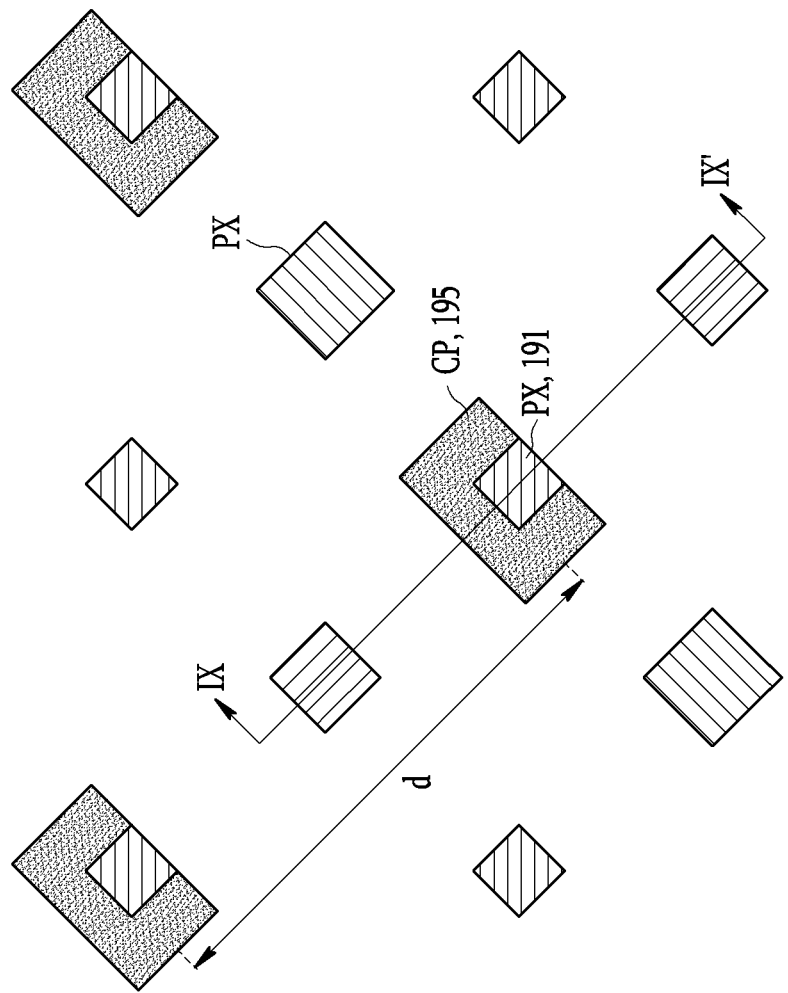
FIG. 8 shows a top plan view of pixels and sensors in a display device according to an embodiment.
Figure 9:
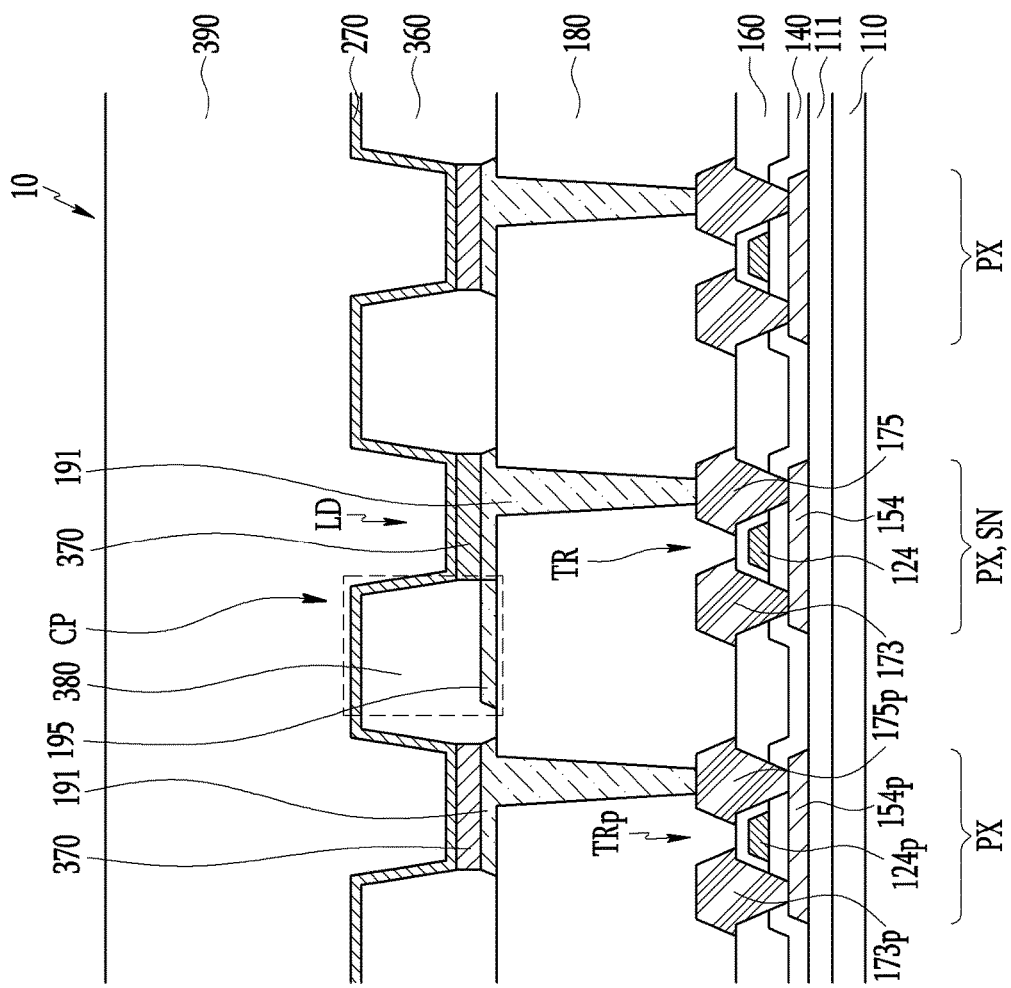
FIG. 9 shows a cross-section view with respect to a line IX-IX' of FIG. 8 according to an embodiment.

FIG. 8 shows a top plan view of a pixel and a sensor in a display device according to an embodiment, and FIG. 9 shows a cross-section with respect to a line IX-IX' of FIG. 8 according to an embodiment.

Referring to FIG. 8 and FIG. 9, a pixel PX and a sensor SN may have configurations analogous to configurations discussed with reference to FIG. 6 and FIG. 7. A difference is the use of the pixel definition layer 360 for the dielectric layer of the sensor capacitor CP without additionally forming a dielectric layer. In an embodiment, a portion of the pixel definition layer 360 overlapping the first electrode 195 functions as the dielectric layer 380 of the sensor capacitor CP. Therefore, no additional dielectric layer may need to be formed, so cost and time for forming the sensor capacitor CP may be minimized.

The distance between the first electrode 195 of the sensor capacitor CP and the common electrode 270 may be substantially large because of a thickness of the pixel definition layer 360, so it may be advantageous to increase the area of the first electrode 195 so as to attain predetermined capacitance. The first electrode 195 is directly and/or electrically connected to the pixel electrode 191. The first electrode 195 may be integrally formed with the pixel electrode 191 on the same layer and with the same material. FIG. 8 shows that the first electrode 195 surrounds (and directly contacts) three sides of the pixel electrode 191, and it may extend from at least one side of the pixel electrode 191 or surround a side of the pixel electrode 191.

While example embodiments have been described, practical embodiments are not limited to the described embodiments. Embodiments are intended to cover various modifications and equivalent arrangements within the spirit and scope of the appended claims.

What is claimed is:

1. A display device comprising:
   a first transistor;
   a second transistor;
   a light emitting device electrically connected to an electrode of the first transistor and comprising a pixel electrode, a common electrode, and a light emitting member positioned between the pixel electrode and the common electrode;
   a sensor capacitor electrically connected to an electrode of the second transistor and comprising a first capacitor electrode, a second capacitor electrode, and a dielectric layer positioned between the first capacitor electrode and the second capacitor electrode, directly contacting both the first capacitor electrode and the second capacitor electrode, and not configured to emit light, wherein the second capacitor electrode is electrically connected to the common electrode, and wherein a material of the electrode of the second transistor is identical to a material of the electrode of the first transistor; and
   an insulating layer, wherein a face of the insulating layer directly contacts each of the pixel electrode and the first capacitor electrode,
   wherein the electrode of the second transistor is electrically connected to the first capacitor electrode, and wherein a minimum distance from the electrode of the second transistor to the second capacitor electrode is equal to a minimum distance from the electrode of the first transistor to the common electrode.

2. The display device of claim 1, further comprising:
a pixel definition layer directly contacting the insulating layer, including an opening that exposes the pixel electrode, and including an opening that exposes the first capacitor electrode.

3. The display device of claim 1, wherein a material of the first capacitor electrode is identical to a material of the pixel electrode.

4. The display device of claim 1, wherein a minimum distance between the first capacitor electrode and the second capacitor electrode is equal to a minimum distance between the pixel electrode and the common electrode.

5. The display device of claim 1, wherein a thickness of the dielectric layer is equal to a thickness of the light emitting member.

6. The display device of claim 1, wherein the insulating layer directly contacts the first transistor.

7. A display device comprising:
a first transistor;
a second transistor;
a light emitting device comprising a pixel electrode, a common electrode, and a light emitting member positioned between the pixel electrode and the common electrode;
a sensor capacitor comprising a first capacitor electrode, a second capacitor electrode, and a dielectric layer positioned between the first capacitor electrode and the second capacitor electrode, directly contacting both the first capacitor electrode and the second capacitor electrode, and not configured to emit light, wherein the second capacitor electrode is electrically connected to the common electrode; and
an insulating layer, wherein a face of the insulating layer directly contacts each of the pixel electrode and the first capacitor electrode, wherein the insulating layer has a first contact hole and a second contact hole, wherein a portion of the pixel electrode extends through the first contact hole from the face of the insulating layer to the first transistor, wherein a portion of the first capacitor electrode extends through the second contact hole from the face of the insulating layer to the second transistor, wherein a first direction is perpendicular to the face of the insulating layer, and wherein a length of the portion of the pixel electrode in the first direction is equal to a length of the portion of the first capacitor electrode in the first direction.

* * * * *